March 12, 1963 R. P. WITT 3,080,909

WIRE BENDING MECHANISM

Filed Aug. 29, 1955

INVENTOR.
Richard P. Witt
BY
Donald P. Smith
Attorney 3,080,909

WIRE BENDING MECHANISM

Richard P. Witt, Alexandria, Va., assignor, by mesne assignments, to Illinois Tool Works Inc., a corporation of Delaware Filed Aug. 29, 1955, Ser. No. 531,098
5 Claims. (Cl. 153—17)

This invention relates to a wire bending device particularly adapted for use with electric circuit assemblies. In mass producing electric circuitry devices, such as radio, television and allied developments, it is necessary to rapidly and economically connected certain parts such as module assemblies to etched or printed circuit boards. It is an object, therefore, of the present invention to provide a device for simultaneously bending multiple projecting wires of a module into intimate contact with other wires or metallic strips forming the etched or printed circuit of the circuit boards.

A further object of the invention is the provision of a wire bending device for uniformly and simultaneously bending to a predetermined degree a plurality of wires in at least four directions.

A still further object of the invention is the provision of a wire bending device maintaining the acting forces substantially balanced so as not to disturb the assembly during bending.

These and other objects will be apparent from the description and the drawings in which.

Figure 1:
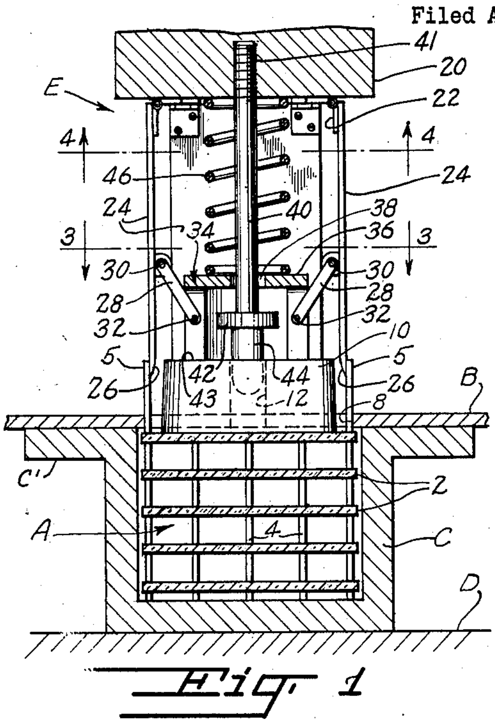
FIG. 1 is a sectional view through one wire bending device.

Referring now to the drawings in detail, the wire bending device is shown as applying a module assembly A to an insulating board B with the module placed in a receiving cup C which may be mounted on a suitable bed plate, indicated in part by reference character D. This receiving cup C is formed with lateral flanges adjacent its open end, the upper face of the flanges being flush with the end of the cup and presenting a relatively wide supporting area and providing a platen for supporting the associated parts during the bending operation. The wire bending device or unit E may be carried by a reciprocating ram or head (not shown). The module, which may take varions forms, in the present instance consists of a plurality of insulating plates or wafers 2 held in place by wires 4 extending transversely of the plates and beyond the top plate so as to provide wire extensions 5. These wires 4 joining the insulators may also serve as parts of the connecting circuits for the various condensers, resistors, etc. mounted on the insulating wafers 2, but not shown in the present case.

Figure 2:
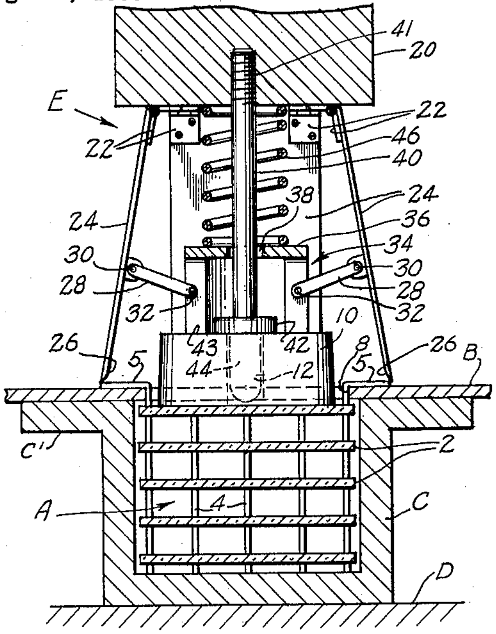
FIG. 2 is a sectional view, similar to FIG. 1, but showthe parts in the wire bent position.
Figure 3:
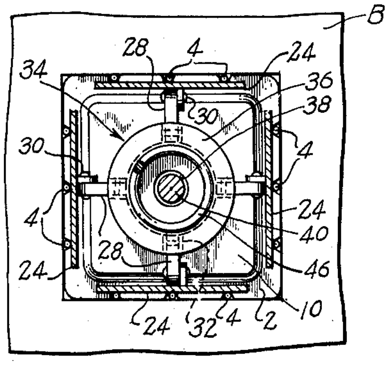
FIG. 3 is a sectional view taken substantially on line 3—3 of FIG. 1.
Figure 5:
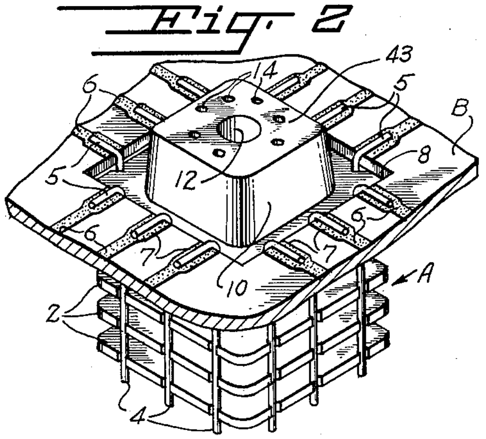
FIG. 5 is a partial perspective view of the final assembly.
Figure 4:
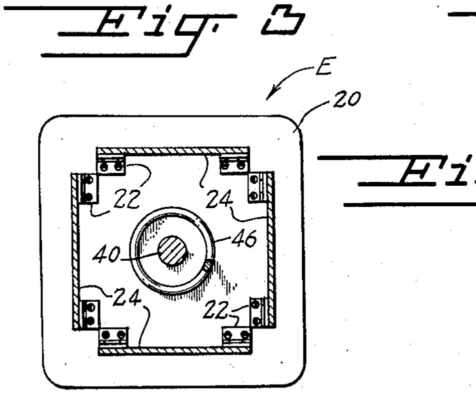
FIG. 4 is a sectional view taken substantially on line 4—4 of FIG. 1.

The insulating board B has etched or printed thereon, in known manner, wires or strips 6 which extend from various assemblies to terminal contacts 7 at the marginal edge of a hole 8, punched or otherwise formed in the board and this hole 8 is of proper dimensions as to closely engage the outer surfaces of the extended wire ends 5 adjacent the top wafer 2 of the module which positions the module with respect to the board B. It will be understood that the wires or strips 6 forming the printed circuit on the board B will correspond in number to the projecting terminals or extensions 5 so that the bending operation performed by the present invention will result in completing circuits from module A to the circuit board B. The module, as shown in the present instance, has mounted on the top wafer a tube socket projection 10 having the usual central opening 12 surrounded by prong receiving openings 14 and containing connectors electrically connected to the various condensers, resistors and the like mounted on the plates or wafers 2. It will, of course, be obvious that various shaped modules may be used other than the module shown. As clearly shown in FIGS. 1 and 2, the module A is first placed in the receiving cup C, carried by any suitable bed plate D, and supporting the etched or printed circuitry board B after it has been lowered over the projecting wire ends 5. The receiving cup C has an internal diameter to snugly receive the module A, thus preventing lateral or rotational displacement which might misalign the connection between the terminals 5 and the circuit strips 6 of panel B. Projecting from the upper outer marginal edge of the cup C are the lateral flanges C′, the flanges C′ forming supporting platens for the printed circuit board B adjacent the cup opening and acting as anvils during the bending operation of the terminals 5 as will be more clearly hereinafter described.

The mounting plate 20 has connected thereto by a plurality of hinges 22 a plurality of bending elements or spreaders 24. As clearly shown, these bending elements or spreaders are formed as flat plates depending from the mounting plate 20 and having their lower edges shown tapered as at 26 to more readily enter between the socket 10 and the wire ends 5. In order to actuate the bending elements or spreaders 24, links 28 are hinged at their outer ends as at 30 to the bending elements and at their inner ends as at 32 to a link control collar or ring 34. This ring or collar 34 is preferably formed of a tubular section, having welded or attached to the upper end a circular plate 36 having a central opening 38 therein through which may extend a post 40. The post 40 is shown as threaded or otherwise attached to the mounting plate 20 at its upper end 41 and carries adjacent its lower end a stop shoulder 42, the lower surface of which is adapted to engage the base or top surface 43 of the socket 10, when the device is in wire bent position. A projection 44 of the post 40 extends downwardly from the stop shoulder 42 and is adapted to ride in the socket hole 12 to guide and center the device with respect to the module. To hold the bending elements or spreaders in their contracted position, a spring 46 is provided surrounding the post 40 and bearing at its upper end on the mounting plate 20 and at its lower end on the circular plate 36. The downward movement of the collar or ring 34 is limited by the links 28 striking the edge of circular plate 36 as clearly shown in FIG. 1.

It will, of course, be understood that the mounting plate 20 may carry either one or a plurality of bending devices and that the bed plate D may carry a plurality of cups C. In using the device, the required number of modules A will be dropped in the receiving cups C and the board B lowered over the modules with the wire ends 5 projecting therethrough. The ram or head supporting the mounting plate or plates 20 must be capable of a controlled reciprocatory motion for actuation of the device and any well known conventional machine structure may be adapted for this purpose. When this actuating member, i.e. the ram or other form of reciprocating head, is actuated it will bring the present device into operative association with the parts to be connected. In the present illustration the disclosure is such that a downward reciprocating motion is essential for the operation of the device and in this illustration the lowering of the ram or head carrying the present device will move the mounting plate 20 with the unit or device E downwardly. Downward movement of the unit E will cause the projection 44 to enter the socket hole 12 and the relationship of these parts should be such that the fitting of the projection 44 into the socket hole 12 will result in a centering and holding of the assembly A against lateral displacement or rotational movement. Upon such downward movement of the bending unit the tapered ends 26 of bending elements or spreaders 24 enter inside the wire terminals 5 and between these terminals and the sockets 10. The tapered extremities 26 of the spreaders 24 facilitate the telescopic relative movement of these associated parts. As soon as the collar or ring 34 engages the top surface 43 of the socket 10, links 28 will simultaneously swing on their pivots 32, the links swinging outwardly and downwardly to simultaneously move the bending elements or spreaders 24 outwardly. This outward movement of the bending elements 24 will immediately effect an outward and simultaneous bending of the wire terminals 5 into substantially the horizontal position shown in FIG. 2, it being noted that the outer faces of the lower ends of the bending elements normally engage the inner faces of the wire ends 5 so as to permit this immediate bending function. When the bending operation is completed the wire ends 5 are in intimate contact with the circuit carrying wires 6 carried by the board B and ready for soldering.

In the present disclosure it will be obvious that the bending elements or spreaders 24 move simultaneously both downwardly and outwardly and thus in the present illustration effect the bending of all of the twelve wire termials 5 into substantially right angle positions against the terminals 7 of the wires 6. While this arrangement of the spreaders may be modified to adapt the mechanism for use in connection with differently formed module assemblies, the present illustration comprehends a module assembly of generally square cross-section so that the links 28 are disposed at 90° about the collar or ring 34. It is by means of this uniform placement of the links 28 that the bending forces cancel each other and there is no tendency for the device to be shifted transversely of the hole 8. This arrangement further aids in providing equally bent portions of all of the terminals and such terminals are brought with the same force into intimate contact with the board circuitry wires 6.

The bending elements or spreaders 24 are shown as of plate-like form, but their specific structure and the number of such elements, as well as the arrangement of the spreaders can be modified in accordance with the shape of the module and the arrangement of the terminals 5 projecting from the module.

It should be noted that the ends 26 of the bending elements or spreaders 24 engage against the tips of the wires 5 to thereby minimize the thrust necessary for the bending operation.

When a module is to be assembled which carries no socket thereon projection 44 should be lengthened somewhat to abut against the top wafer of the module to arrest the downward motion of the assembly at a proper position where the bending element ends engage against the wire tips as aforesaid.

What I claim is:

1. A wire bending device for assembling articles, said device comprising a movable mounting plate, a post fixed on said mounting plate and depending therefrom, a collar slidably mounted on said post for abutting engagement at one end thereof against an article, means urging said collar along said post in a direction away from said mounting plate for engagement with an article, a bending element movably mounted at one end thereof on said mounting plate and extending therefrom substantially in the same direction as said post, a link connecting said collar and said bending element for limiting the movement of said collar and normally retaining said bending element in its upright position, means hinging opposite ends of said link to said bending element and to said collar respectively whereby movement of said mounting plate relative to said collar causes said bending element to move relative to said post, and stop means to limit movement of said collar in said direction.

2. A wire bending device for bending a plurality of wires fixed to an article, said device comprising a mounting plate, a post fixed at one end to said mounting plate and extending therefrom, a collar slidably mounted on said post for abutting engagement at one end thereof against a portion of said article adjacent to said wires, a plurality of elongated bending elements each hingedly mounted at one end thereof to said mounting plate and extending therefrom substantially in the same direction as said post, and a plurality of links, each of said links having its upper end hinged to a different one of said bending elements and its lower opposite end hinged to said collar whereby movement of said collar along said post and relative to said mounting plate causes said bending elements to swing radially of said post.

3. A wire bending device for bending a plurality of wires fixed to an article, said device comprising a mounting plate, a post fixed at one end to said mounting plate and extending therefrom, a collar slidably mounted on said post for abutting engagement at one end thereof against a portion of said article adjacent to said wires, a plurality of elongated bending elements each hingedly mounted at one end thereof to said mounting plate and extending therefrom substantially in the same direction as said post, a plurality of links, each of said links having its upper end hinged to one of said bending elements and its opposite end hinged to said collar whereby movement of said collar along said post and relative to said mounting plate causes said bending elements to swing radially of said post, and stop means to limit sliding movement of said collar in both directions on said post.

4. A wire bending device for bending a plurality of wires fixed to an article, said device comprising a mounting plate, a post fixed at one end to said mounting plate and extending therefrom, a collar slidably mounted on said post for abutting engagement at one end thereof against a portion of said article adjacent to said wires, a plurality of elongated bending elements each hingedly mounted at one end thereof to said mounting plate and extending therefrom substantially in the same direction as said post, a plurality of links, each of said links having its lower end hinged to said collar and its upper end hinged to a different one of said bending elements whereby movement of said collar along said port and relative to said mounting plate causes said bending elements to swing radially of said post, and means urging said collar along said post in a direction away from said mounting plate, and stop means on said post in the path of movement of said collar to limit movement of said collar in said direction, said stop means including a portion thereof for contacting said article when said one collar end is in abutment with said article portion to limit movement of said collar toward said mounting plate.

5. A wire bending device for assembling articles, a base for supporting the articles to be assembled, said device comprising a reciprocating mounting plate, a post fixed on said mounting plate and depending therefrom, a collar slidably mounted on said post for abutting engagement at one end thereof against an article, means urging said collar along said post in a direction away from said mounting plate for engagement with said article, a bending element movably mounted at one end thereof on said mounting plate and extending therefrom substantially in the same direction as the post, and a link means hingedly mounted at its upper end to said bending element and at its lower end to said collar for limiting the downward movement of said collar on said post, the outer end of said link means being movable in an arc upon downward movement of said mounting plate and bending element to cause said bending element to swing radially of said post.

References Cited in the file of this patent

UNITED STATES PATENTS

| | | |
|---|---|---|
| 1,390,282 | Eaton | Sept. 13, 1921 |
| 1,493,502 | Riegel | May 13, 1924 |
| 1,524,106 | Riegel | Jan. 27, 1925 |
| 1,664,619 | Girard | Apr. 3, 1928 |
| 1,766,214 | Booth | June 24, 1930 |
| 1,854,371 | Engel | Apr. 19, 1932 |
| 1,867,288 | Thomas | July 12, 1932 |
| 2,475,732 | Yeo | July 12, 1949 |
| 2,840,134 | Rayburn et al. | June 24, 1958 |